United States Patent
Konopnicki et al.

(10) Patent No.: US 11,182,681 B2
(45) Date of Patent: Nov. 23, 2021

(54) GENERATING NATURAL LANGUAGE ANSWERS AUTOMATICALLY

(71) Applicant: International Business Machines Corporation, Armonk, NY (US)

(72) Inventors: David Konopnicki, Haifa (IL); Priscilla Santos Moraes, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 15/459,134

(22) Filed: Mar. 15, 2017

(65) Prior Publication Data

US 2018/0268300 A1     Sep. 20, 2018

(51) Int. Cl.
*G06N 5/02* (2006.01)
*G06F 16/338* (2019.01)
*G06F 16/332* (2019.01)
*G06F 40/295* (2020.01)

(52) U.S. Cl.
CPC .......... *G06N 5/022* (2013.01); *G06F 16/338* (2019.01); *G06F 16/3329* (2019.01); *G06F 40/295* (2020.01)

(58) Field of Classification Search
CPC .................. G06N 5/022; G06N 16/3329
See application file for complete search history.

(56) References Cited

U.S. PATENT DOCUMENTS

| | | |
|---|---|---|
| 6,498,921 B1 | 12/2002 | Ho et al. |
| 7,209,876 B2 | 4/2007 | Miller et al. |
| 9,864,795 B1 * | 1/2018 | Halevy ............... G06F 16/285 |

(Continued)

FOREIGN PATENT DOCUMENTS

CA     2566927     5/2007

OTHER PUBLICATIONS

Moriceau, Véronique. "Generating intelligent numerical answers in a question-answering system." Proceedings of the fourth international natural language generation conference. 2006. (Year: 2006).*

(Continued)

*Primary Examiner* — Kevin W Figueroa
(74) *Attorney, Agent, or Firm* — Gassner Intellectual Property (57) ABSTRACT

A computerized method comprising receiving, from a question answering system, a minimal answer value to a query submitted by a user. Also received are electronic documents based on the minimal answer value, and a document score value, associated with the query, for each of the electronic documents. The method comprises extracting entities and attributes from electronic documents, and for each computing one or more associated score value, and aggregating the document score value with the associated score values. The method comprises selecting some of entities and attributes based on the respective aggregated score value, thereby producing selected associated elements. The method comprises generating, using a computerized natural language (NL) generating system, a comprehensive NL answer, wherein the generating is based on the minimal answer value and the selected associated elements, and sending the comprehensive NL answer for presentation to the user.

20 Claims, 3 Drawing Sheets

(56) References Cited

U.S. PATENT DOCUMENTS

2004/0167875 A1* 8/2004 Sneiders ........... G06F 16/24522
2013/0018652 A1* 1/2013 Ferrucci ............. G06F 16/3329
                                                            704/9
2014/0377735 A1  12/2014 Byron et al.
2015/0365527 A1  12/2015 Chakravarthy et al.

OTHER PUBLICATIONS

Kulkarni, "Experiments in Non-Factoid Question Answering", a thesis submitted to the University of Minnesota, Aug. 2013.
Yao, "Feature-Driven Question Answering with Natural Language Alignment", a dissertation submitted to Johns Hopkins University, Jul. 2014.
Soricut et al., "Automatic Question Answering: Beyond the Factoid", Information Retrieval, Mar. 2006, p. 191-206, vol. 9, Issue 2.
Heilman, "Automatic Factual Question Generation from Text", Submitted in partial fulfillment of the requirements for the degree of Doctor of Philosophy in Language and Information Technologies, Carnegie Mellon University, 2011.
Gyawali, "Answering Factoid Questions via Ontologies : A Natural Language Generation Approach", Submitted in partial fulfillment of the requirements for the Degree of European Master of Science in Human Language Science and Technology, Sep. 15, 2011.

* cited by examiner

GENERATING NATURAL LANGUAGE ANSWERS AUTOMATICALLY

BACKGROUND

The invention relates to the field of computerized question answering.

Computerized question answering systems may answer user queries by returning a single entity and/or attribute, such as a minimal factlet answer, a minimal answer, or the like. As used herein, the term query means a question asked by a user. As used herein, the term factlet means a single entity and/or attribute value, such as a text value, a date value, a numerical value, or the like, that may be associated with an answer to a query. The minimal answer and text passages, such as electronic documents, may be extracted from the results of an Internet search query received from a search engine, such as Google®. Each of the electronic document results may also be associated with a score, for example a score value reflecting the relevance of the electronic document to the query and/or minimal answer. As used herein, the term passage means electronic documents or the like. Queries may be in a natural human language, and lexically processed to identify the query type, entities, keywords, constraints, expected answer type, and/or the like, that may determine the minimal answer itself, related attributes, response templates, and/or the like. The minimal answer to present as a response may be presented as a natural language response using suitable templates determined from the lexical processing.

An entity and relationship extraction system may search for entities, attributes of entities, relationships between entities and/or attributes, and/or the like within electronic documents, such as Wikipedia web pages for example, to build a knowledge base connecting entities and/or attributes, such as the Yago knowledge base.

A natural language generation system may receive text, values, dates, and/or the like and produce a sentence in a natural language containing the received elements.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using one or more hardware processors for receiving, from a computerized question answering system a minimal answer value resulting from a query submitted by a user. Also received are electronic documents based on which the computerized question answering system computed the minimal answer value, and a document score value for each of the electronic documents, wherein the document score value is associated with the query. The method comprises the action of extracting entities and attributes from electronic documents. For each of entities and for each of attributes, the method comprises the actions of (i) computing one or more associated score values, and (ii) aggregating one or more of the document score values with the one or more of the associated score values. The method comprises the action of selecting some of entities and some of attributes based on the respective aggregated score value, thereby producing selected associated elements. The method comprises the action of generating, using a computerized natural language (NL) generating system, a comprehensive NL answer, wherein the generating is based on the minimal answer value and the selected associated elements. The method comprises the action of sending the comprehensive NL answer for presentation to the user.

In some embodiments, the comprehensive NL answer is generated by selecting one or more answer templates based on the query, the minimal answer, and the selected associated elements, assigning the minimal answer and selected associated elements to fields of the answer template(s), and transforming the answer template(s) to one or more paragraphs to produce the comprehensive NL answer.

In some embodiments, the computing comprises using one or more functions from the group consisting of a rank of the search query results each entity/attribute was found in, a frequency of the entity/attribute across all the retrieved passages, a proximity of the entity/attribute to an answer to the query, a match of the entity/attribute to information in a database, and a completeness of the entity/attribute information.

In some embodiments, the method further comprises receiving, from a computerized question answering system, one or more of a provenance and an evidence for each of the electronic documents.

In some embodiments, the minimal answer value comprises minimal answer entities and minimal answer attributes.

In some embodiments, some of attributes each comprise a textual answer.

In some embodiments, the query is an ambiguous query and the comprehensive NL answer comprises alternative attributes from two or more alternative entities of equally suitable answers.

There is provided, in accordance with an embodiment, a computer program product for query answer generation, the computer program product comprising a non-transitory computer-readable storage medium having program code embodied therewith, the program code executable by one or more hardware processors. The program code comprises processor instructions to receive, from a computerized question answering system a minimal answer value resulting from a query submitted by a user, electronic documents based on which the computerized question answering system computed the minimal answer value, and a document score value for each of the electronic documents, wherein the document score value is associated with the query. The program code comprises processor instructions to extract entities and attributes from electronic documents. The program code comprises processor instructions to, for each of entities and for each of attributes, compute one or more associated score values, and aggregate one or more of the document score values with the one or more associated score values. The program code comprises processor instructions to select some of entities and some of attributes based on the respective aggregated score value, thereby producing selected associated elements. The program code comprises processor instructions to generate, using a computerized natural language (NL) generating system, a comprehensive NL answer, wherein the generating is based on the minimal answer value and the selected associated elements. The program code comprises processor instructions to send the comprehensive NL answer for presentation to the user.

In some embodiments, the comprehensive NL answer is generated by selecting one or more answer templates based on the query, the minimal answer, and the selected associated elements, assigning the minimal answer and selected associated elements to fields of the answer template(s), and transforming the answer template(s) to one or more paragraphs to produce the comprehensive NL answer.

In some embodiments, the aggregating comprises using one or more functions from the group consisting of a rank of the search query results each entity/attribute was found in, a frequency of the entity/attribute across all the retrieved passages, a proximity of the entity/attribute to an answer to the query, a match of the attribute to information in a database, and a completeness of the attribute information.

In some embodiments, the program code further comprises processor instructions to receive, from a computerized question answering system, one or more of a provenance and an evidence for each of the electronic documents.

In some embodiments, the minimal answer value comprises minimal answer entities and minimal answer attributes.

In some embodiments, some of the attributes each comprise a textual answer.

In some embodiments, the query is an ambiguous query and the comprehensive NL answer comprises alternative attributes from two or more alternative entities of equally suitable answers.

There is provided, in accordance with an embodiment, a computer system for query answer generation, comprising at least one hardware processor, and a non-transitory computer-readable storage medium having program code embodied thereon. The program code executable by the hardware processor(s) to receive, from a computerized question answering system a minimal answer value resulting from a query submitted by a user, electronic documents based on which the computerized question answering system computed the minimal answer value, and a document score value for each of the electronic documents, wherein the document score value is associated with the query. The program code executable by the hardware processor(s) to extract entities and attributes from electronic documents. For each of entities and for each of attributes compute one or more associated score values, and aggregate one or more of the document score value with the associated score value(s). The program code executable by the hardware processor(s) to select some of entities and some of attributes based on the respective aggregated score value, thereby producing selected associated elements. The program code executable by the hardware processor(s) to generate, using a computerized natural language (NL) generating system, a comprehensive NL answer, wherein the generating is based on the minimal answer value and the selected associated elements. The program code executable by the hardware processor(s) to send the comprehensive NL answer for presentation to the user.

In some embodiments, the comprehensive NL answer is generated by selecting one or more answer templates based on the query, the minimal answer, and the selected associated elements, assigning the minimal answer and selected associated elements to fields of the answer template(s), and transforming the answer template(s) to one or more paragraphs to produce the comprehensive NL answer.

In some embodiments, the computing comprises using one or more functions from the group consisting of a rank of the search query results each entity/attribute was found in, a frequency of the entity/attribute across all the retrieved passages, a proximity of the entity/attribute to an answer to the query, a match of the entity/attribute to information in a database, and a completeness of the entity/attribute information.

In some embodiments, the computer system further comprises program code executable by the hardware processor(s) to receive, from a computerized question answering system, one or more of a provenance and an evidence for each of the electronic documents.

In some embodiments, the minimal answer value comprises minimal answer entities and minimal answer attributes.

In some embodiments, some of the attributes each comprise a textual answer.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Described herein are computerized methods and devices for comprehensive question answering and natural language answer generation. A computerized question answering system receives a query and returns a minimal answer, and a set of passages associated with the query and/or minimal answer. Each passage may be an electronic document, with an associated document score that relates to how well the passage relates to the answer to the query. A comprehensive answer may be determined from the passages by searching and extracting entities, attributes, relationships, and/or the like, from the passages, and computing associated scores for each of the entities, attributes, relationships, and/or the like (such as entity-associated score values, attribute-associated score values, relationship-associated score values, and/or the like), that based on how each may relate to the query and/or minimal answer. Such an extraction may be referred to as a mapping. For each of the extracted elements (entities, attributes, relationships, etc.) passage scores are aggregated with the element score, and the aggregated scores are ranked to determine the relevant extracted elements that should be included in the comprehensive answer. The minimal answer and relevant extracted elements are used to compose a comprehensive natural language answer (such as by a computerized natural language answering generator), and the comprehensive answer is sent to a terminal to display to a user instead of the minimal answer.

For example, based on a user query, the type of the entity or attribute being searched for may be determined, such as a person, a date, a business metric, and/or the like. Further, the query may state the conditions the answer may satisfy. Question answering systems may retrieve a minimal answer, and the passages (search results, such as electronic documents or parts thereof, web pages or parts thereof, and/or the like) that may contain the answer(s) to the query, be associated with the minimal answer and/or query, and/or the like. Each passage result may comprise a text and a search result document score value. Extraction of entities, attributes, relationships between entities, and/or the like, may be determined from the passages using entity and relationship extraction systems. After extracting the entities and attributes in each passage, weights and/or scores may be assigned for each element mapping (for example, the weight may be used to represent the probability for a specific entity or attribute to appear in the passage). The scores associated with each passage, entity, attribute, relationship, and/or the like, may be aggregated to reflect the respective inclusion of each within the passages. This aggregate score indicates the best associated entities and/or attributes related to the comprehensive answer of the query better than the search result score, and by picking the top k elements based on the aggregate score (such as the highest aggregated score values), the comprehensive answer and associated attributes to present to the user may be selected. Answer generation may be the natural language output of the minimal answer, comprehensive answer(s), supporting evidence, attributes, reference, and/or the like.

This technique solves the problem of determining a comprehensive answer when the question answering system returns a minimal answer. In many cases, the minimal answer may not be a suitable answer to the query, such as when the query or answer are ambiguous, when there is more than one correct answer, when the answer may contain multiple factlets, and/or the like.

Figure 1:
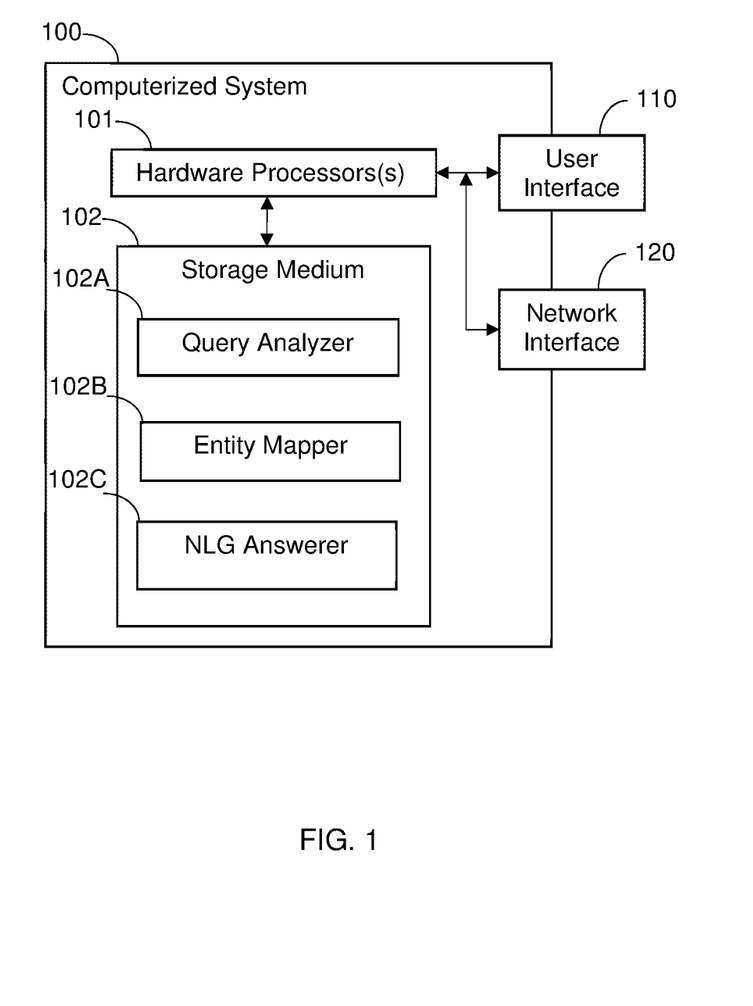
FIG. 1 shows a system for comprehensive answer generation in natural language.

Reference is now made to FIG. 1, which shows a system 100 for comprehensive answer generation in natural language. System 100 comprises one or more hardware processors 101 and a storage medium 102. Optionally, system 100 comprises a user interface 110 and/or a network interface 120. Storage medium 102 has encoded thereon processor instructions, such as in modules, for instructing hardware processor(s) 101 to perform a mapping of entities and attributes, and using the mapping to select a comprehensive answer to a query. For example, a Query Analyzer module 102A comprises processor instructions for receiving a query text, a minimal answer, search result passages (with associated passage/document scores), and/or the like, and analyzing these to determine one or more associated elements, such as entities, attributes, relationships, and/or the like. For example, an Entity Mapper module 102B comprises processor instructions for mapping the entities and attributes to each passage that contains them, assigning weights and/or scores for each element (such as entity-associated score values, attribute-associated score values, and/or the like), and computing an aggregate score based on the query search score, passage scores, and the element scores/weightings. For example, an NLG (Natural Language Generation) Answer module 102C comprises processor instructions for selecting one or more of the passages, entities, attributes, and/or the like, based on the aggregate scores (such as based on a ranking of the scores), selecting one or more templates based on the selected passages, composing a comprehensive NLG answer based on the minimal answer and extracted elements, and sending the comprehensive answer to a user terminal for presentation to a user. Element (entity, attribute, relationship, etc.) associated scores may be computed based on a ranking of the element in a single document, multiple documents, all documents, etc. A frequency of the element may also be used in computing the associated score. A proximity in characters/words to a target may be used, a matching between the element and other elements may be used, a element completeness may be used, and/or the like.

Figure 2:
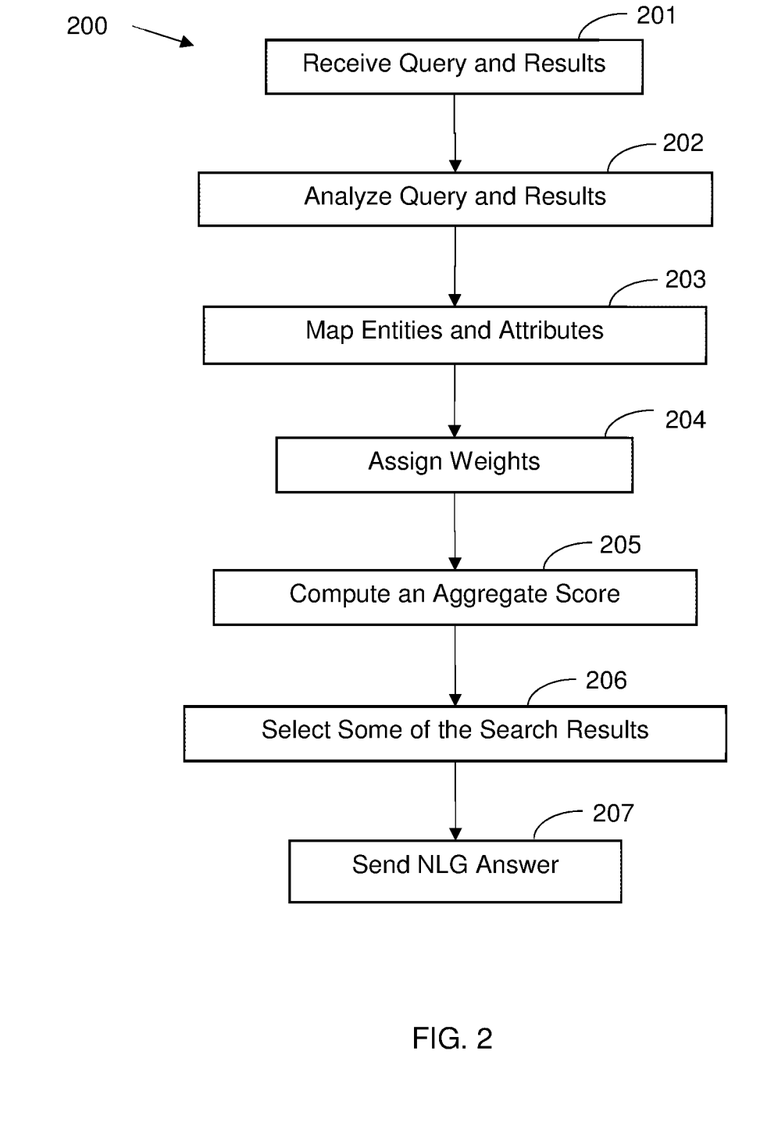
FIG. 2 shows a flowchart for comprehensive answer generation in natural language.

Reference is now made to FIG. 2, which shows a flowchart 200 for comprehensive answer generation in natural language. A Query Analyzer module 102A may comprise processor instructions for receiving 201 a query text and search result passages, analyzing 202 these to determine a query type, entities, attributes, and/or the like. An Entity Mapper module 102B may comprise processor instructions for mapping 203 the entities and attributes in each passage to that passage, assigning 204 weights for each mapping, and computing 205 an aggregate score based on the query search score and the weightings. An NLG Answer module 102C may comprise processor instructions for selecting 206 one or more of the passages, entities, attributes, and/or the like, based on the aggregate scores, selecting one or more templates based on the selected passages et al., composing a comprehensive NLG answer based on the previous selections, and sending 207 the comprehensive answer to a user terminal for presentation to a user.

Figure 3:
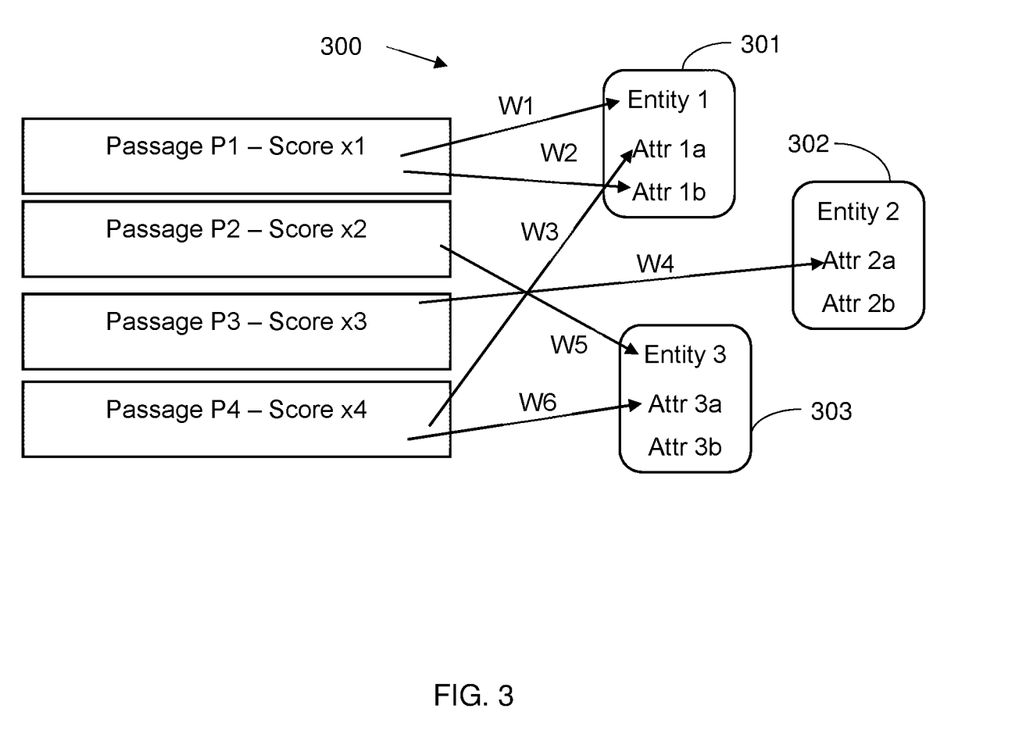
FIG. 3 shows a mapping for comprehensive answer generation in natural language.

Reference is now made to FIG. 3, which shows a mapping 300 for comprehensive answer generation in natural language. Passages P1, P2, P3, and P4 may each mention one or more entities, such as 301, 302, or 303, each entity having associated attributes, such as 1a, 1b, 2a, 2b, 3a, and/or 3b. The mapping 203 for each entity or attribute in each passage such as W1, W2, W3, W4, W5, and W6 may each be assigned a value, such as 1.1, 1.4, 1.7, 2.3, 1.04, 1.3224, and/or the like. For each passage, an aggregate score may be computed, such as using a product of the search engine ranking score, such as x1, x2, x3, and/or x4, by the mapping weights. For example, the aggregate score for passage P1 is x1*W1*W2, for passage P2 is x2*W5, and for passage P3 is x3*W4.

Following are concrete examples of using mappings for natural language comprehensive answer generation.

For example, a query of type "who—person" is a query "Who was the CEO of IBM in 1975?" Passages may contain the text from Wikipedia "List of IBM CEOs. The following is a chronological list of people who have served as chief executive officer of IBM [ . . . ] Thomas J. Watson (1914-1956) [ . . . ] Frank T. Cary (1973-1981) [ . . . ]". The query and answer may be parsed to the data:

Source: article "IBM" in Wikipedia
Minimal Answer Entity—Frank T. Cary
Satisfied Conditions (Evidences):
   the CEO of IBM
   Time interval: [1973, 1981]
which may produce a NLG Answer "According to the "IBM" article in Wikipedia, Frank T. Cary was the CEO of IBM between 1973 and 1981." Note, the NLG answer may contain more information than just a minimal answer, as a human answer might contain. The question answering system may provide evidence, attributes, and/or the like to the NLG system. Those may be included in the comprehensive answer to explain the results. The advantages of NLG comprehensive answers for query results as opposed to "minimal" factlet answers may be incorporation of provenance, such as the original source of a fact, the place it was documented for the first time, justification, and/or the like.

Content determination may analyze the search query, such as determining the type of the object being searched for and the conditions it must fulfill. Content determination may analyze the search result passages for entity/attribute retrieval, such as factlet(s) identification in passages together with the conditions it satisfies (evidences). For example, a system executing the method may decide which evidences to present, such as "between 1973 and 1981".

Document planning may comprise template(s) selection, such as selecting the appropriate template(s) based on query analysis, factlet(s) retrieved and available evidences. Document planning may bind template(s) variables with query variables and factlets. The document may be further analyzed for lexical choices, such as use the abbreviation CEO as in the query or use the phrase "chief executive officer" as in the passage. The resulting document may be transformed into sentences, and multiple sentences may be transformed to paragraphs, such as using a second template.

For example, in content determination a query "Who was the CEO of IBM in 1975?" may be analyzed to determine that the type of minimal query answer is a "Who: person" with the additional query conditions, such as constraints of "CEO of IBM" and 1975. The factlet retrieval may include retrieval of passages, including the text "List of IBM CEOs . . . . Frank T. Cary (1973-1981) . . . ". The factlet identification in passages may determine that the source is the "IBM" article in Wikipedia, and the minimal answer entity is "Frank T. Cary" which also satisfies the conditions of "CEO of IBM" and time range between 1973 to 1981. The document planning step in this example may select the template(s) according to a source template, such as "According to <Source>,", an answer template such as "<factlet> was", property/attribute template "<property>", and a date range template "between <start> and <end>". Template variables may be associated (bound/mapped) with query variables and factlets. The templates may be transformed to sentences by aggregation, such as combining templates into a paragraph, resulting in the comprehensive answer "According to the "IBM" article in Wikipedia article, Frank T. Cary was the CEO of IBM between 1973 and 1981".

Following are factlet query examples. For example, a query may be "What was the highest number of BTR-60 Armored Personnel Carriers in the Indian Army at one time?" This query may be parsed into type "what:number" with the condition "the highest number of BTR-60 Armored Personnel Carriers in the Indian Army at one time". A retrieved passage may include the text "[ . . . ] At peak there were 817 BTR-60s in service. [ . . . ]". An NLG comprehensive answer based on this passage may be "According to [source], the highest number of BTR-60 in service at one time was 817."

For example, a query may be "What was the processing capacity of the Belfield gas plant in 2013?" A retrieved passage may include the text "The Belfield gas plant was processing 17 MMcf/d of gas (gross) as of Feb. 1, 2013". The NLG comprehensive answer may be "According to the EX-99 form submitted by Whiting Petroleum Corp in 2014, the Belfield gas plant was processing 17 MMcf/d of gas (gross) as of Feb. 1, 2013."

For example, a query may be "What country did Umberto II leave the throne of in 1946?" For example, a query may be "What is the Solar Impulse?" These examples may be processed similarly.

Following are examples of factlet aggregation queries. For example, a simple aggregation across multiple sources may be the query "How many drilling rigs were in the Eagle Ford in 2011?" For example, an aggregation query may compare across time or some other dimension, such as the query "How has Microsoft revenue evolved since 2012?" For example, an ambiguous question may be the query "Who invented the light bulb?"

In the example of simple aggregation across multiple sources the query "How many drilling rigs were there in Eagle Ford in 2011?" may retrieve multiple passages, such as from a search engine. For example, Carrizo Oil and Gas Inc. may have submitted a public domain federal form EX-99 in 2011 stating that "The company currently has three rigs drilling on its Eagle Ford properties." For example, Copano Energy LLC may have submitted a public domain federal form EX-99 in 2011 stating that "Over 160 rigs currently running in the Eagle Ford." The NLG comprehensive answer may be "Two companies had drilling rigs in Eagle Ford in 2011: Carrizo Oil and Gas Inc. had three rigs drilling[1] while Copano Energy LLC had over 160 rigs[2]. Sources—1: Carrizo Oil and Gas Inc. EX-99 2011 2: Copano Energy LLC EX-99 2011." Templates may be used for each factlet and then an additional template may be used to combine the templates into one paragraph.

For example, a comparison over time (or other dimensions) query may be "How has Microsoft revenue evolved since 2012?" The retrieved passages may include the table data "2012: $73.72B, 2013: $77.85B, 2014: $86.83B, 2015: $93.58B", sourced from Microsoft annual income statements. The NLG comprehensive answer may be "Microsoft revenue has steadily raised since 2012. The raise was slightly more that 5% in 2012 and 2013, peaked at 11.69% in 2014 and was 7.20% in 2015.", using a NLG module especially developed for summarizing graph data, such as iGraph-Lite, TREND (described by Boyd in "TREND: A System for Generating Intelligent Descriptions of Time-Series Data (1998)" in the Proceedings of the IEEE International Conference on Intelligent Processing Systems (ICIPS-1998)), and/or the like.

An example of an ambiguous query may be "Who invented the light bulb?" which results in the retrieved passages "Wikipedia Joseph Swan: Sir Joseph Wilson Swan, D. Sc. h. c., FRS (31 Oct. 1828-27 May 1914) was a British physicist and chemist. He is most famous for inventing the first incandescent light bulb." and "Wikipedia Thomas Edison: Thomas Alva Edison was an American inventor and businessman. He developed many devices that greatly influenced life around the world, including the phonograph, the motion picture camera, and the long-lasting, practical electric light bulb." The NLG comprehensive answer may be formulated as "Several answers are possible for this question, the most popular one being Thomas Edison[1] while others include Joseph Swan[2] Sources—1: Wikipedia item Thomas Edison, 2: Wikipedia item Joseph Swan." Another example of an ambiguous query may be "What is the tallest mountain in the world?"

An example of a non-factlet query may be one that produces an inherently textual answer, such as "What was the Capital expenditure guidance of Jumpin Mining in 2015?" In this example, the comprehensive answer may include the best passage together with provenance information. The NLG comprehensive answer may be "The capital expenditure guidance of Jumpin Mining in 2015 is described in the Operation and Development section of their 2015 annual report. It states "Capital expenditures for 2015 are expected to be $350 million. The Company expects to spend $40 million less on sustaining capital expenditures at Juana and $10 million less on sustaining capital expenditures at Nova Vista. In total, this represents a reduction of $50 million from the previous guidance."

Following are aspects of an embodiment of a disclosed method. A server receives a query for an answer, such as a factlet, a combination of factlets, a text answer, and/or the like, and may use conventional techniques to search for passages related to the query. The query input may contain text, such as natural language text, search terms, and/or the like, images, video, structured data, and/or the like. Each passage may be retrieved by a search engine and transferred to a server with a rank, score, and/or the like, such as retrieved from a database, from a web server (Wiki), from an information retrieval system, computed, and/or the like. The server analyzes each passage and identify additional information in proximity to the minimal answer to the query. The server sets the additional information as attributes, where each attribute may be weighted, such as by the rank of the passage it was found in, its frequency across all the retrieved passages, its proximity to the minimal answer, its match to the information in the database (i.e. address may be missing a term), and/or the like. The weights for the attributes may be aggregated by the server, to decide which attribute to include with the comprehensive answer based on the weights.

Following are aspects of an additional embodiment of a disclosed method. A server extracts multiple passages from an information retrieval system, select top k passages. Each passage may have a scope that includes an answer to the query, and additional attributes are extracted from the passage, such as by text analysis. To combine the passages into a relevant comprehensive answer, the passages are given weights and/or scores based on proximity of attributes to minimal answers, such as from the complete search results. For example, frequency of attributes is used to determine the comprehensive answer. For example, frequency of attributes and proximity to the minimal answer within the text are used to determine the comprehensive answer. Attributes may be aggregated for determining a comprehensive answer to present to a user who initiated the query.

Once a search result text passage is determined to contain at least some of the comprehensive answer to the query, the elements within the passage may be scored according to the relevancy. The passages may be searched, such as a text search, for additional attributes that may be relevant to the comprehensive answer, each attribute receiving an attribute associated score, such as according to the frequency of occurrence, the proximity to the minimal answer text, a retrieved database value, and/or the like. The scores may be aggregated, such as by computing an aggregate score using the answer score, the passage score, and the element (entity, attribute, etc.) scores, and one or more of the identified answers selected for presenting to a user. A selected comprehensive answer(s) may be bound in size, so one or more answers are selected from the search results according to the aggregated score and the answer(s) fit within a predefined size. The selected comprehensive answer(s) may be presented to a user based on a template of similar answers, natural language generation, and/or the like.

Optionally, additional information may be presented such as provenance, evidence, and/or the like. For example, comprehensive answers may state the provenance and the evidences for the answer, such as "2000 web sites contain the text "Scaramouche, Scaramouche, will you do the Fandango?" including the web sites: . . . ".

The systems and methods disclosed herein may locate, select, and present comprehensive answers to a large variety of answer types, such as minimal answers, textual answers, multiple factlet answers, ambiguous comprehensive answers, inherently non-fact answers, and/or the like. The problem solved is to generate a natural language comprehensive answer, optionally with supporting information embedded in within the text of the answer. The supporting information may be the provenance, evidence, references, links for further reading, constraint information (such as a range of associated values for which the comprehensive answer is valid), and/or the like.

For example, a query is "When was Margaret Thatcher born?". A list of search results (passages) is analyzed for determining the minimal answer (entity) within each passage and associated attributes, such as metadata, link address, and/or the like. For each passage a score is calculated based on the search engine ranking score and attribute weights. The attributes may be weighted according to their occurrence in all the passages, a retrieved database value, and/or the like. The product of the passage ranking score with the weights of the attribute associated scores in that passage may produce the importance of the passage to the minimal answer. The top k passages may be selected to describe the comprehensive answer.

For example, to a query "Who wrote Huckleberry Finn?" a comprehensive answer may be:
Samuel L. Clemens, an American author and humorist, better known as Mark Twain, wrote "Adventures of H. F" in 1884

For example, to a query "Who is called the Iron Lady?" a comprehensive answer may be:
Margaret Thatcher, the former prime minister of the United Kingdom, in office between 1979 and 1990 was called the Iron Lady.

Generating an automated description of one or more related factlets of the answer, such as associated with ontology nodes, may be presented to the user. Given a query, selecting attributes may be the minimal answer, related to the answer, essential to describing an entity, and/or the like. For example, a query may be "where was M. Thatcher born?" A comprehensive answer may be "Margaret Thatcher, prime minister of the UK [essential to describing an entity], was born in Grantham, Lincolnshire, UK [the minimal answer] on Oct. 13 1925 [essential to describing a comprehensive answer]."

It may be possible to provide details about several factlets in one comprehensive answer, such as "who wrote Huckleberry Finn?". A comprehensive answer may be "Samuel Langhorne Clemens [the minimal answer] better known as Mark Twain (1835, 1910), American author and humorist [essential to describing an entity], wrote the novel "Adventures of Huckleberry Finn" [essential to describing the answer] in 1884 [essential to describing an entity]."

To compute a comprehensive answer, the entities and attributes that form the answer of a query may be identified. The identification may require the use of disambiguation algorithms. For each of those identified entities, depending on the context, the user, and/or the like, additional "essential" attributes may be selected. A comprehensive answer may be a generated textual description of the identified entities and attributes. Essential attributes may be learned from the data. For example, the attributes are used to describe an entity. For example, the attributes are linked with each other, such as a place and a date the person (i.e. the entity) was born.

Passage retrieval may be used to retrieve search results. Mapping from entities and attributes to an ontology may give the scores for selecting answer(s). Natural language generation from an ontology may present the comprehensive answer in a natural language with the associated metadata. Using the mapping from passages to entities may decide what parts of the ontology to express in the answer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
    receiving, from a computerized question answering system:
        (a) a minimal answer value resulting from a query submitted by a user,
        (b) a plurality of electronic documents based on which the computerized question answering system computed the minimal answer value, and
        (c) a document score value for each of the electronic documents, wherein the document score value is associated with the query and denotes how well the respective electronic document relates to the minimal answer value;
    extracting a plurality of entities and a plurality of attributes from the plurality of electronic documents, wherein:
        each of the entities is selected from the group consisting of: a person, a date, and a business metric, and
        each of the attributes describes a respective one of the entities;
    for each of the plurality of entities:
        (i) computing at least one entity-associated score value, and
        (ii) aggregating at least one of the document score value with the at least one entity-associated score value;
    for each of the plurality of attributes:
        (i) computing at least one attribute-associated score value, and
        (ii) aggregating at least one of the document score value with the at least one attribute-associated score value;
    selecting at least one of the plurality of entities and at least one of the plurality of attributes based on the respective aggregated score values, thereby producing selected associated elements;
    generating, using a computerized natural language (NL) generating system, a comprehensive NL answer, wherein the generating is based on the minimal answer value and the selected associated elements; and
    sending the comprehensive NL answer for presentation to the user.

2. The method according to claim 1, wherein the comprehensive NL answer is generated by:
    selecting at least one answer template based on the query, the minimal answer, and the selected associated elements;
    assigning the minimal answer and selected associated elements to fields of the at least one answer template; and
    transforming the at least one answer template to at least one paragraph to produce the comprehensive NL answer.

3. The method according to claim 1, wherein the computing of the at least one entity-associated score value comprises using at least one function from the group consisting of:
    at least one of a rank and a score of the search query results each attribute was found in,
    a frequency of the attribute across all the retrieved passages,
    a proximity of the attribute to an answer to the query,
    a match of the attribute to information in a database, and
    a completeness of the attribute information.

4. The method according to claim 1, wherein the computing of the at least one attribute-associated score value comprises using at least one function from the group consisting of:
    at least one of a rank and a score of the search query results each attribute was found in,
    a frequency of the attribute across all the retrieved passages,
    a proximity of the attribute to an answer to the query,
    a match of the attribute to information in a database, and
    a completeness of the attribute information.

5. The method according to claim 1, further comprising receiving, from the computerized question answering system, at least one of a provenance and an evidence for each of the electronic documents.

6. The method according to claim 1, wherein the minimal answer value comprises at least one minimal answer entities and at least one minimal answer attributes.

7. The method according to claim 1, wherein the query is an ambiguous query and the comprehensive NL answer comprises alternative attributes from at least two alternative entities of equally suitable answers.

8. A computer program product for query answer generation, the computer program product comprising a non-transitory computer-readable storage medium having program code embodied therewith, the program code executable by at least one hardware processor to:
    receive, from a computerized question answering system:
        (a) a minimal answer value resulting from a query submitted by a user,
        (b) a plurality of electronic documents based on which the computerized question answering system computed the minimal answer value, and
        (c) a document score value for each of the electronic documents, wherein the document score value is associated with the query and denotes how well the respective electronic document relates to the minimal answer value;
    extract a plurality of entities and a plurality of attributes from the plurality of electronic documents, wherein:
        each of the entities is selected from the group consisting of: a person, a date, and a business metric, and
        each of the attributes describes a respective one of the entities;
    for each of the plurality of entities:
        (i) compute at least one entity-associated score value, and
        (ii) aggregate at least one of the document score value with the at least one associated entity-score value;
    for each of the plurality of attributes:
        (i) compute at least one attribute-associated score value, and
        (ii) aggregate at least one of the document score value with the at least one attribute-associated score value;
    select at least one of the plurality of entities and at least one of the plurality of attributes based on the respective aggregated score values, thereby producing selected associated elements;
    generate, using a computerized natural language (NL) generating system, a comprehensive NL answer, wherein the generating is based on the minimal answer value and the selected associated elements; and
    send the comprehensive NL answer for presentation to the user.

9. The computer program product according to claim 8, wherein the comprehensive NL answer is generated by:
   selecting at least one answer template based on the query, the minimal answer, and the selected associated elements;
   assigning the minimal answer and selected associated elements to fields of the at least one answer template; and
   transforming the at least one answer template to at least one paragraph to produce the comprehensive NL answer.

10. The computer program product according to claim 8, wherein the computing of the at least one entity-associated score value comprises using at least one function from the group consisting of:
   at least one of a rank and a score of the search query results each entity was found in, a frequency of the entity across all the retrieved passages,
   a proximity of the entity to an answer to the query,
   a match of the entity to information in a database, and
   a completeness of the entity information.

11. The computer program product according to claim 8, wherein the computing of the at least one attribute-associated score value comprises using at least one function from the group consisting of:
   at least one of a rank and a score of the search query results each attribute was found in, a frequency of the attribute across all the retrieved passages,
   a proximity of the attribute to an answer to the query,
   a match of the attribute to information in a database, and
   a completeness of the attribute information.

12. The computer program product according to claim 8, further comprising program code executable by the at least one hardware processor to receive, from the computerized question answering system, at least one of a provenance and an evidence for each of the electronic documents.

13. The computer program product according to claim 8, wherein the minimal answer value comprises at least one minimal answer entities and at least one minimal answer attributes.

14. The computer program product according to claim 8, wherein the query is an ambiguous query and the comprehensive NL answer comprises alternative attributes from at least two alternative entities of equally suitable answers.

15. A computer system for query answer generation, comprising:
   at least one hardware processor; and
   a non-transitory computer-readable storage medium having program code embodied thereon, the program code executable by the at least one hardware processor to:
   receive, from a computerized question answering system:
      (a) a minimal answer value resulting from a query submitted by a user,
      (b) a plurality of electronic documents based on which the computerized question answering system computed the minimal answer value, and
      (c) a document score value for each of the electronic documents, wherein the document score value is associated with the query and denotes how well the respective electronic document relates to the minimal answer value;
   extract a plurality of entities and a plurality of attributes from the plurality of electronic documents, wherein:
      each of the entities is selected from the group consisting of: a person, a date, and a business metric, and
      each of the attributes describes a respective one of the entities;
   for each of the plurality of entities:
      (i) compute at least one entity-associated score value, and
      (ii) aggregate at least one of the document score value with the at least one entity-associated score value;
   for each of the plurality of attributes:
      (i) compute at least one attribute-associated score value, and
      (ii) aggregate at least one of the document score value with the at least one attribute-associated score value;
   select at least one of the plurality of entities and at least one of the plurality of attributes based on the respective aggregated score values, thereby producing selected associated elements;
   generate, using a computerized natural language (NL) generating system, a comprehensive NL answer, wherein the generating is based on the minimal answer value and the selected associated elements; and
   send the comprehensive NL answer for presentation to the user.

16. The computer system according to claim 15, wherein the comprehensive NL answer is generated by:
   selecting at least one answer template based on the query, the minimal answer, and the selected associated elements;
   assigning the minimal answer and selected associated elements to fields of the at least one answer template; and
   transforming the at least one answer template to at least one paragraph to produce the comprehensive NL answer.

17. The computer system according to claim 15, wherein the computing of the at least one entity-associated score value comprises using at least one function from the group consisting of:
   a rank of the search query results each attribute was found in,
   a frequency of the attribute across all the retrieved passages,
   a proximity of the attribute to an answer to the query,
   a match of the attribute to information in a database, and
   a completeness of the attribute information.

18. The computer system according to claim 15, wherein the computing of the at least one attribute-associated score value comprises using at least one function from the group consisting of:
   a rank of the search query results each attribute was found in,
   a frequency of the attribute across all the retrieved passages,
   a proximity of the attribute to an answer to the query,
   a match of the attribute to information in a database, and
   a completeness of the attribute information.

19. The computer system according to claim 15, further comprising program code executable by the at least one hardware processor to receive, from a computerized question answering system, at least one of a provenance and an evidence for each of the electronic documents.

20. The computer system according to claim 15, wherein the minimal answer value comprises at least one minimal answer entities and at least one minimal answer attributes.

* * * * *